United States Patent [19]

May et al.

[11] 4,371,399

[45] Feb. 1, 1983

[54] WATER-REPELLENT GYPSUM MORTAR

[75] Inventors: Adolf May, Hofheim am Taunus; Franz J. Voetz, Camberg; August Gerl, Frankfurt am Main, all of Fed. Rep. of Germany

[73] Assignee: Hoechst Aktiengesellschaft, Fed. Rep. of Germany

[21] Appl. No.: 347,313

[22] Filed: Feb. 9, 1982

[30] Foreign Application Priority Data

Feb. 14, 1981 [DE] Fed. Rep. of Germany ....... 3105407

[51] Int. Cl.³ ............................................... C04B 11/00
[52] U.S. Cl. ..................................... 106/109; 106/111; 106/314
[58] Field of Search ........................ 106/109, 111, 314

[56] References Cited

U.S. PATENT DOCUMENTS 2,791,511 5/1957 Lipkind et al. ..................... 106/109
4,042,409 8/1977 Terada et al. ...................... 106/111

*Primary Examiner*—James Poer
*Attorney, Agent, or Firm*—Connolly and Hutz

[57] ABSTRACT

A water-repellent gypsum mortar contains an agent conferring hydrophobic properties, which is composed of (a) a fatty amine of the formula

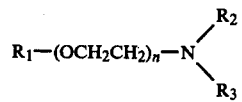

in which $R_1$ is $C_8$–$C_{22}$-alkyl, $C_8$–$C_{22}$-alkenyl or $C_8$–$C_{22}$-alkylphenyl, $R_2$ and $R_3$ are hydrogen, $C_1$–$C_4$-alkyl, $C_2$–$C_4$-alkenyl, $C_1$–$C_4$-alkoxy-$C_1$–$C_4$-alkyl, $C_1$–$C_4$-hydroxyalkyl, phenyl, benzyl or a group of the formula —$(CH_2CH_2O)_nH$ and n is a number from 0 to 4, (b) a low-molecular acid and
(c) an alkali metal siliconate.

3 Claims, No Drawings

WATER-REPELLENT GYPSUM MORTAR

In the manufacturing trades, there is increasing interest in water-repellent gypsum mortar for the fabrication of corresponding plasterboard and sandwich-type plasterboard. For this purpose, silicones are used at present, but these are expensive. Moreover, their effect is impaired by the carbon dioxide content of the air. Salts of fatty acids have already been disclosed as additives, conferring hydrophobic properties, for concrete, but these show only an insufficient effect in gypsum. The effect of alkyl-siliconates in conferring hydrophobic properties is also already known, but this effect is inadequate in the case of gypsum.

It has now been found that mixtures of fatty amines, acids and alkyl-siliconates display an effect in conferring hydrophobic properties, which is substantially stronger than the effect of the individual components and which, with respect to long-term stability, is also superior to the effect of polysiloxanes.

The invention thus relates to a water-repellent gypsum mortar, which contains an agent conferring hydrophobic properties, which is composed of (a) a fatty amine of the formula

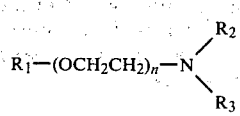

in which $R_1$ is $C_8$–$C_{22}$-alkyl, preferably $C_{14}$–$C_{22}$-alkyl, $C_8$–$C_{22}$-alkenyl, preferably $C_{14}$–$C_{22}$-alkenyl, or $C_8$–$C_{22}$-alkylphenyl, $R_2$ and $R_3$ are hydrogen, $C_1$–$C_4$-alkyl, $C_2$–$C_4$-alkenyl, $C_1$–$C_4$-alkoxy-$C_1$–$C_4$-alkyl, $C_1$–$C_4$-hydroxyalkyl, phenyl, benzyl or a group of the formula —$(CH_2CH_2O)_nH$ and n is a number from 0 to 4, (b) a low-molecular acid and (c) an alkali metal siliconate of the formula

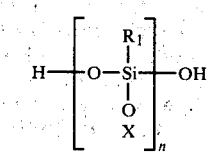

in which $R_1$ is $C_1$–$C_7$-alkyl, preferably methyl, $C_1$–$C_7$-alkenyl, phenyl or benzyl, X is an alkali metal ion and n is a number from 1 to 10.

The fatty amines which can be used are above all saturated and unsaturated fatty amines and mixtures thereof, such as are obtained from natural fats, for example tallow fatty amine, coconut fatty amine, stearylamine, oleylamine or palmitylamine. The low-molecular acids are essentially $C_1$–$C_4$-carboxylic acids, such as formic acid or acetic acid, dicarboxylic acids, such as oxalic acid or malonic acid, hydroxycarboxylic acids, such as lactic acid, and monobasic inorganic acids, such as hydrochloric acid or nitric acid, or also amidosulfonic acid. The molar mixing ratio of amine to acid can vary within wide limits and is 1:3 up to 100:1, preferably 1:2 to 64:1.

Starting from the corresponding fatty acids and fatty alcohols, the fatty amines are prepared by the known processes of cyanolysis or aminolysis, by an addition reaction of ammonia and subsequent hydrogenation. The siliconates are prepared by reacting a short-chain alkylene with chlorosilanes and alkali metal hydroxides. Due to internal condensation, only a part of the siliconates is present in the monomeric form. Usually, these are marketed as aqueous solutions.

The weight ratio of these siliconates to the mixture of fatty amine and acid is between 5:1 and 1:5.

The concentration of the complete agent conferring hydrophobic properties, calculated as 100% of solid matter, is about 0.2 to 5% by weight, relative to the gypsum.

To prepare the water-repellent gypsum mortar, the fatty amines are initially mixed with the acid in the desired ratio within the limits indicated above, and partially neutralized. Water-containing pastes having a solids content of about 40–60% by weight or stock dispersions having a solids content of about 5 to 20% by weight are thus prepared. These stock dispersions or pastes are added to the water for the preparation of the gypsum mortar. After this, the gypsum is sprinkled in, together with the alkali metal siliconate. The weight ratio of gypsum to water is 2:3 to 5:3, as is conventional in the processing of gypsum mortar. The sequence of addition can also be such that first the siliconate, then the gypsum and finally the partially neutralized fatty amine are added to the water. In appropriately equipped plants, it is also possible to mix all the four components simultaneously.

The gypsum mortar thus prepared is distinguished by its improved water-repellent characteristics, as compared with the gypsum mortar which has been rendered hydrophobic by means of substances hitherto used for this purpose. The gypsum mortar according to the invention can be further processed by methods known per se, for example to give plasterboard or sandwich-type plasterboard.

EXAMPLES 612 g of water were initially introduced into a stirred vessel and 34 g of a 10% aqueous methyl-siliconate solution were stirred in. 680 g of gypsum were then added, and the mixture was allowed to some extent to form a "sump". Finally, 34 g of a 10% aqueous dispersion of amine salt were also added and the whole was stirred. This gypsum paste was cast in a prismatic mould. After setting, 3 test specimens of size 4×4×16 cm were taken and dried to constant weight at 40° C. The water absorption of these test specimens was then examined by the following methods.

1. Needle-punched felt test

The apparatus used for the needle-punched felt test is a basin in which a needle-punched felt having a pile of about 1 cm is kept continuously wet at constant temperatures and constant water level. The end face of the test specimens was placed on the needle-punched felt, and the water absorption of this test specimen was measured after 168 hours.

2. Full immersion

A 2 l beaker was filled with 1.5 l of water into which the test specimen was fully immersed. The water absorption of the test specimen was measured after 2 hours.

The tables which follow give a review of the type and quantity of the particular components (a), (b) and (c) used, and of the water absorption, according to the methods described above, in the case of gypsum bodies which were rendered hydrophobic with the mixture of these components (a), (b) and (c).

1. Mixture of fatty amine salt and sodium methyl-siliconate in a weight ratio of 1:1

| | Molar ratio Amine:Acid | % by weight of water absorption | |
|---|---|---|---|
| | | Full immersion | Needle-punched felt |
| 1% of dodecylamine/acetic acid | 1:1 | 42.8 | 32.6 |
| 2% of dodecylamine/acetic acid | 1:1 | 38.6 | 30.2 |
| 3% of dodecylamine/acetic acid | 1:1 | 25.4 | 21.3 |
| 1% of stearylamine/acetic acid | 16:1 | 11.7 | 0.2 |
| 2% of stearylamine/acetic acid | 16:1 | 0.6 | 0.1 |
| 3% of stearylamine/acetic acid | 16:1 | 0.2 | 0.05 |
| 1% of stearylamine/acetic acid | 32:1 | 9.8 | 2.1 |
| 2% of stearylamine/acetic acid | 32:1 | 0.8 | 0.1 |
| 3% of stearylamine/acetic acid | 32:1 | 0.4 | 0.1 |

2. Mixture of fatty amine salt and methyl-siliconate in a weight ratio of 3:1

| | Molar ratio Amine:Acid | % by weight of water absorption | |
|---|---|---|---|
| | | Full immersion | Needle-punched felt |
| 1% of hexadecylamine/formic acid | 64:1 | 18.5 | 7.3 |
| 2% of hexadecylamine/formic acid | 64:1 | 3.2 | 0.9 |
| 3% of hexadecylamine/formic acid | 64:1 | 0.7 | 0.1 |
| 1% of stearylamine/acetic acid | 16:1 | 8.2 | 1.5 |
| 2% of stearylamine/acetic acid | 16:1 | 0.8 | 0.05 |
| 3% of stearylamine/acetic acid | 16:1 | 0.2 | 0.05 |
| 1% of stearyldimethyl-amine/formic acid | 16:1 | 19.4 | 10.1 |
| 2% of stearyldimethyl-amine/formic acid | 16:1 | 5.3 | 0.9 |
| 1% of nonylphenoxy-ethylamine/amidosulfonic acid | 32:1 | 12.6 | 5.7 |
| 2% of nonylphenoxy-ethylamine/amidosulfonic acid | 32:1 | 3.8 | 0.8 |
| 3% of nonylphenoxy-ethylamine/amidosulfonic acid | 32:1 | 1.0 | 0.08 |

For comparison, the water absorption was measured for gypsum bodies which were rendered hydrophobic either only with a fatty amine salt or only with sodium methyl-siliconate, under the conditions indicated above.

| | Molar ratio Amine:Acid | % by weight of water absorption | |
|---|---|---|---|
| | | Full immersion | Needle-punched felt |
| 2% of dodecylamine/acetic acid | 16:1 | 33 | 23 |
| 2% of tetradecylamine/acetic acid | 16:1 | 8.3 | 15.5 |
| 2% of hexadecylamine/acetic acid | 16:1 | 2.9 | 3.3 |
| 2% of stearylamine/acetic acid | 16:1 | 10.5 | 4.4 |
| 2% of stearylamine/hydrochloric acid | 32:1 | 24.9 | 7.4 |
| 2% of stearylamine/formic acid | 16:1 | 14.2 | 10.1 |
| 1% of stearylamine/acetic acid | 16:1 | 38.0 | 27.0 |
| 3% of stearylamine/acetic acid | 16:1 | 40.1 | 26.2 |
| 1% of sodium methyl-siliconate | | 43.0 | 26.4 |
| 2% of sodium methyl-siliconate | | 32.2 | 9.6 |
| 3% of sodium methyl-siliconate | | 27.8 | 6.1 |
| without hydrophobic treatment | | 60 | 68 |

The percentage number given in the first column in the above tables indicates the quantity used, in percent by weight relative to gypsum, of the agent conferring hydrophobic properties.

We claim:

1. A water-repellent gypsum mortar, which contains an agent conferring hydrophobic properties, which is composed of (a) a fatty amine of the formula

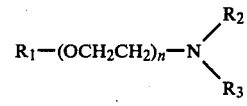

in which $R_1$ is $C_8$–$C_{22}$-alkyl, preferably $C_{14}$–$C_{22}$-alkyl, $C_8$–$C_{22}$-alkenyl, preferably $C_{14}$–$C_{22}$-alkenyl, or $C_8$–$C_{22}$-alkylphenyl, $R_2$ and $R_3$ are hydrogen, $C_1$–$C_4$-alkyl, $C_2$–$C_4$-alkenyl, $C_1$–$C_4$-alkoxy-$C_1$–$C_4$-alkyl, $C_1$–$C_4$-hydroxyalkyl, phenyl, benzyl or a group of the formula —$(CH_2CH_2O)_nH$ and n is a number from 0 to 4, (b) a low-molecular acid and (c) an alkali metal siliconate of the formula

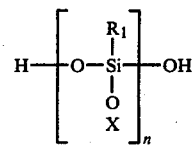

in which $R_1$ is $C_1$–$C_7$-alkyl, $C_1$–$C_7$-alkenyl, phenyl or benzyl, X is an alkali metal ion and n is a number from 1 to 10.

2. A water repellent gypsum mortar as claimed in claim 1, which contains 0.2 to 5% by weight of the agent conferring hydrophobic properties.

3. A water-repellent gypsum mortar as claimed in claim 1, wherein, in the agent conferring hydrophobic properties, the weight ratio of fatty amine to acid is 1:3 to 100:1 and the weight ratio of this partially neutralized fatty amine to alkali metal siliconate is 5:1 to 1:5.

* * * * *